April 28, 1970  G. C. VORIE  3,509,566
METHOD AND APPARATUS FOR OBTAINING AZIMUTH AND RANGE
FROM A SCANNING CONTINUOUS WAVE RADAR
Filed Nov. 1, 1967

INVENTOR
GILBERT C. VORIE

BY
ATTORNEY

United States Patent Office 3,509,566
Patented Apr. 28, 1970

3,509,566
METHOD AND APPARATUS FOR OBTAINING AZIMUTH AND RANGE FROM A SCANNING CONTINUOUS WAVE RADAR
Gilbert C. Vorie, Elma, N.Y., assignor to Cornell Aeronautical Laboratory, Inc., Buffalo, N.Y., a corporation of New York
Filed Nov. 1, 1967, Ser. No. 679,776
Int. Cl. G01s 9/02
U.S. Cl. 343—10     4 Claims

ABSTRACT OF THE DISCLOSURE

Method and apparatus for locating a single target employing a narrow beam of electromagnetic radiation that is caused to scan an area first in a clockwise direction then in a counterclockwise direction, and noting the respective elapsed times from the start of the respective scans to the times of reception of the respective reflections from a target within a scanned area; the beam being continuously emitted during each scan cycle.

BACKGROUND OF THE INVENTION

The present invention relates to a method of and apparatus for determining the range, azimuth and/or elevation of a single target utilizing a scanning radar having a continuous emission during the scanning period.

In many applications, as space docking for example, it is necessary to locate the position of one target with respect to another. Present methods for locating such targets employ standard pulse-listen techniques wherein the total scan angle is divided into small angular resolution elements with each being sequentially investigated for the presence of the object of interest.

With standard pulse-listen techniques the target acquisition time is long, since after each transmitted pulse the transmitter must be deactivated to allow the receiver to respond to or listen for the reflected pulses, if any, from the target.

In addition, pulse-listen techniques require relatively low scanning rates as the range of the target increases such that there will exist sufficient reflected energy from the target. However, with high velocity targets it is desirable to have high scanning rates for target acquisition. If the scanning rate is low, the probability of missing a high speed target is increased.

SUMMARY OF THE INVENTION

The foregoing and other disadvantages and limitations are overcome according to the present invention wherein a radar that emits a continuous wave within the total scan angle is employed to determine the location of any single target within such scan angle.

Basically, the present invention provides a method and apparatus of single target radar acquisition comprising, the steps of; causing a beam of electromagnetic radiation to scan an area at a fixed rate in a clockwise direction, noting the time interval from the start of the clockwise scan to the reception of a reflected signal from a target within the area, causing the beam of electromagnetic radiation to scan said area at a fixed rate in a counterclockwise direction, and noting the time interval from the start of the counterclockwise scan to the reception of a reflected signal from said target.

BRIEF DESCRIPTION OF THE DRAWINGS

For a fuller understanding of the present invention reference should be had to the accompanying drawings wherein.

DESCRIPTION OF THE PREFERRED EMBODIMENTS

Figure 1:
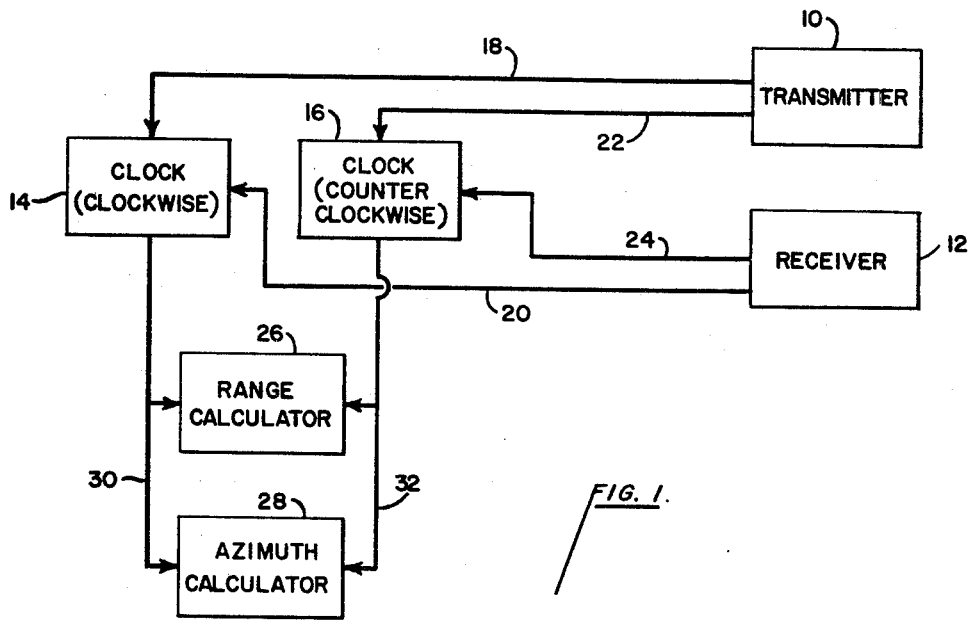
FIGURE 1 is a schematic in block form of the apparatus according to the present invention.

Referring now to the drawings and more particularly to FIGURE 1, a scanning radar transmitter is shown schematically at 10. Transmitter 10, as will become apparent hereinbelow, must be of the type that delivers a fairly narrow beam of electromagnetic radiation and could typically comprise a phased-array, narrow-beam scanning microwave radar as is currently available; alternatively a laser scanner, of the general type disclosed in Ser. No. 583,370 (and modified as discussed below) filed Sept. 30, 1966, by Gilbert C. Vorie and assigned to the assignees of the present application, may be advantageously employed. The emission of transmitter 10 is continuous over the total scan angle chosen. Suitable means (not illustrated) are provided to effect scanning of the transmitter beam in a clockwise and counterclockwise direction. With the aforementioned phased-array radar such means would typically comprise a number of individual antenna elements spatially displaced by a known fraction of the transmission wavelength. The beam position is formed by suitable phasing of the antenna elements. Scanning is accomplished by varying the phase between elements by analog or digital control techniques, for example.

Figure 2:
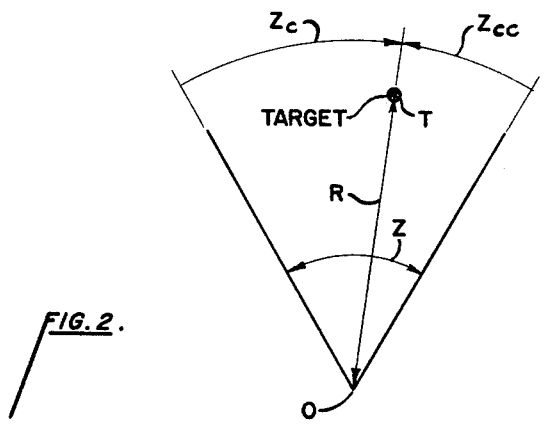
FIGURE 2 is a sketch illustrative of the principles of the present invention.

If the laser scanner of Ser. No. 583,370 is employed, clockwise and counterclockwise scanning could be achieved by a slight modification thereof. In that application, a raster scan is produced by the varying intersection point of horizontal and vertical stress waves produced in separate isotropic plates 14 and 16 (see FIGURE 2 therein) that become anisotropic under stress. Before a ray emerging from the laser can return in the preferential polarization plane it must pass and return through both plates, since the magnitude of the excitation voltage on the plates is chosen to introduce a 45° phase shift as a ray makes one pass through the plate (see pages 3–6 in Ser. No. 583,370). To adapt this structure to the present radar scanning technique, the plates would be arranged such that vertical stress waves in each would originate from opposite directions. This could be accomplished simply by rotating plate 14 in Ser. No. 583,370 as shown in FIGURE 2 thereof counterclockwise 90°. In addition, the magnitude of the excitation voltage on the plates would now be chosen to introduce a 90° phase shift to the rays passing through each plate. The consequence of this is that a ray need pass and return through the stress wave of only one plate before it is rotated back into the preferential excitation plane of the laser. Thus, the laser beam will scan the laser output aperture in one direction when one of the plates is active and in the other direction when the other plate is active. Suitable optics, such as cylindrical lenses at right angles, may be provided to shape and steer the scanning beams emanating from the laser aperture.

Referring again to FIGURE 1, a conventional receiver 12 is provided adjacent transmitter 10 and functions to accept all signals returned over the total scan angle of transmitter 10.

Time responsive means in the form of two clocks 14 and 16 are provided to respond to signals from the transmitter and receiver.

Clock 14, termed a clockwise clock, functions to measure the time elapsed from the start of the clockwise scan of transmitter 10 to the reception of a signal from a target by receiver 12. To this end, clock 14 is started by a signal in line 18 from transmitter 10 and stopped by a signal in line 20 from receiver 12.

Similarly, clock 16, termed a counterclockwise clock, functions to measure the time elapsed from the start of the counterclockwise scan of transmitter 10 to the reception of a signal from the target by receiver 12; this clock being started by a signal in line 22 from the transmitter and stopped by a signal in line 24 from the receiver.

It has been found, as will be shown hereinbelow, that a knowledge of the time elapsed from the start of the clockwise scan to the reception of a signal from the target during this scan and a knowledge of the time elapsed from the start of the counterclockwise scan to the reception of a signal from the target during this scan, together with a knowledge of the scanning rates is sufficient data to enable the azimuth or elevation and range of the target to be calculated.

Thus, suitable calculators 26 and 28 for range and azimuth, respectively, can be provided to respond to time measurement signals from clocks 14 and 16 via lines 30 and 32, respectively. The scanning rate information will generally be fixed and can be built into the calculators. The range and azimuth signals from calculators 26 and 28 can be applied to suitable indicating and or control apparatus (not illustrated).

The manner in which the range and azimuth of the target is determined by the above time measurements together with the operation of the method and apparatus according to the present invention will now be discussed with reference to FIGURE 2.

With the transmitter and receiver located at point O and the target located at point T it can be seen that the time elapsed from the start of the clockwise scan to the reception of a reflected signal is (1)
$$T_c = 2R + Z_c$$

where:

$T_c$ is the time in seconds,
$R$ is the range to the target in seconds, and
$Z_c$ is the target azimuth measured clockwise expressed in time units.

Similarly, the time elapsed from the start of the counterclockwise scan to the reception of the reflected signal from the target is (2)
$$T_{cc} = 2R + Z_{cc}$$

where:

$T_{cc}$ is the time in seconds and
$Z_{cc}$ is the target azimuth measured counterclockwise expressed in time units;

but since
(3)
$$Z = Z_c + Z_{cc}$$
where:

$Z$ is the time taken to complete one scan in the clockwise or counterclockwise direction, combining Equations 1, 2, and 3 and solving for range, it follows that (4)
$$R = \frac{T_c + T_{cc} - Z}{4}$$

and solving for $Z_c$ it follows that (5)
$$Z_c = \frac{T_c - T_{cc} + Z}{2}$$

From the foregoing it should be readily apparent that to determine the range and azimuth of a target, it is only necessary to measure $T_c$ and $T_{cc}$ since $Z$ is already known; it being equivalent to the scanning rate multiplied by the total scanned sector.

As an example of the operation of the present invention, it is assumed that the time to complete one scan is 10 microseconds ($Z=10$) over a total scan angle of 40°. The clockwise scan begins and 105 microseconds later a signal is received from the target; therefore, $T_c = 105$. The counterclockwise scan follows and 105 microseconds later a signal is received from the target; therefore, $T_{cc} = 105$. Of course, after each scan a dwell period for listening must follow. The length of this dwell will depend upon the maximum expected target range.

From Equation 4 the range of the target expressed in time units is $$\frac{105 + 105 - 10}{4}$$

of 50 microseconds or 4.05 nautical miles.

From Equation 5 the azimuth in the clockwise direction of the target expressed in time units, is $$\frac{105 - 105 + 10}{2}$$

or 5 microseconds in scanning time. Since the total scan angle is 40° and it is covered in 10 microseconds, the clockwise azimuth ($Z_c$) of the target is $$\left(\frac{5(40)}{10}\right)$$

or 20°.

In this example, if the maximum unambiguous single target ranges is 100 microseconds or 8.1 nautical miles, the total time required to interrogate the target is 420 microseconds. This would permit a cycle pulse repetition frequency of 2,380 cycles per second, and a range of accuracy of about three feet should be possible based on a signal-to-noise ratio of 14 db.

The high rate of target acquisition of the present invention will be appreciated when the 420 microseconds required is compared to the 550 seconds required with a standard-listen 50-mile optical radar having 1000 x 1000 angular resolution elements.

It is apparent, in order to operate satisfactorily, the scanning rate of the beam must be much greater than the anticipated reflection times, which is easily satisfied by either of the scanners mentioned herein.

While the invention has been described in its preferred embodiment, it is understood that many chanegs may be made by those skilled in the art without departing from the spirit of the invention, which is to be limited only by the scope of the appended claims.

What is claimed is:

1. Apparatus for determining the location of a target, comprising;
    (a) means for causing a beam of electromagnetic radiation to scan an area in a clockwise direction,
    (b) means responsive to the time elapsed from the start of the clockwise scan to the reception of a reflected signal from a target within said area,
    (c) means for causing said beam to scan said area in a counterclockwise direction, and
    (d) means responsive to the time elapsed from the start of the counterclockwise scan to the reception of a reflected signal from said target.

2. The apparatus according to claim 1, wherein there is further provided;
    (e) range and azimuth calculator means each responsive to said time responsive means.

3. The apparatus according to claim 1, wherein;
    (e) the clockwise and counterclockwise scanning rates are constant.

4. The apparatus according to claim 3, wherein;
    (f) the clockwise and counterclockwise scanning rates are equal.

(References on following page)

References Cited

UNITED STATES PATENTS

| | | |
|---|---|---|
| 2,562,341 | 7/1951 | Starr. |
| 2,977,592 | 3/1961 | Bruck. |
| 3,017,630 | 1/1962 | Begovich et al. ____ 343—16 X |
| 3,117,317 | 1/1964 | Kenyon _____ 343—12 X |
| 3,243,812 | 3/1966 | Williams _____ 343—12 |

FOREIGN PATENTS 957,235    5/1964    Great Britain.

RODNEY D. BENNETT, Primary Examiner

M. F. HUBLER, Assistant Examiner

U.S. Cl. X.R.

343—12, 16